Aug. 22, 1944.   K. J. YOST   2,356,295
ARTICLE CLASSIFYING DEVICE
Filed May 7, 1942   3 Sheets-Sheet 3
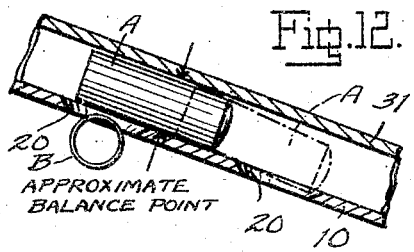
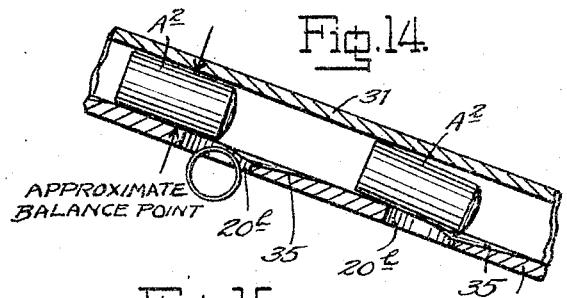
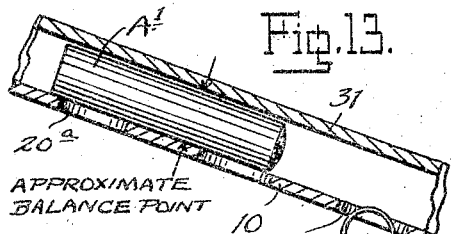
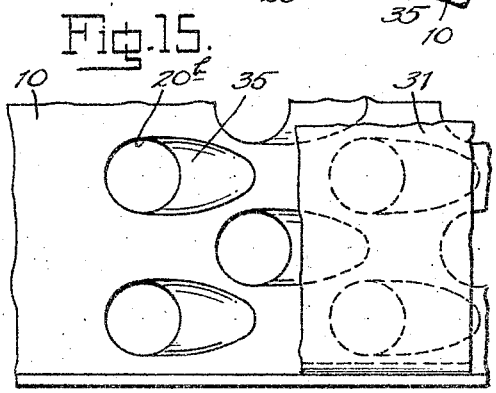
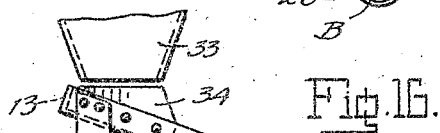
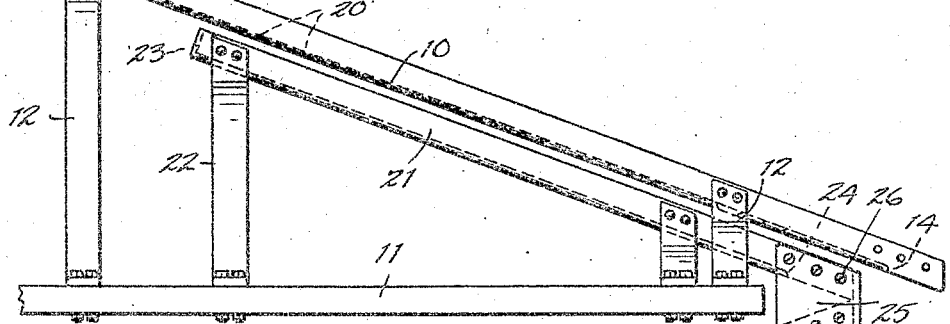
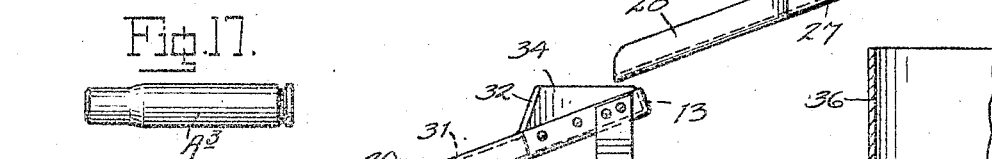
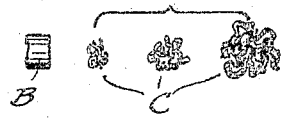
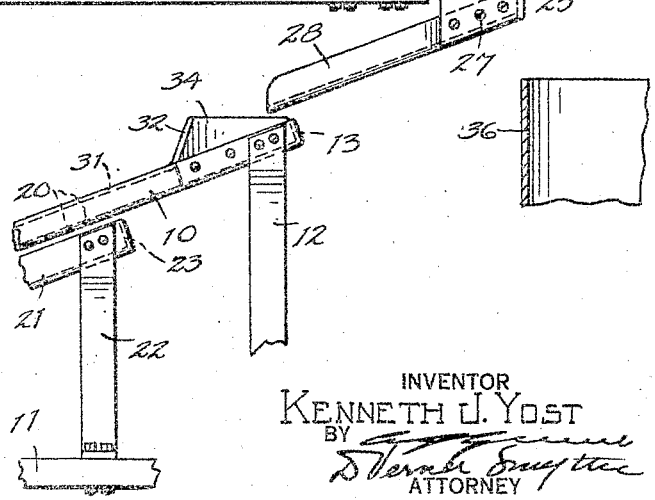
INVENTOR
KENNETH J. YOST
BY
ATTORNEY Patented Aug. 22, 1944

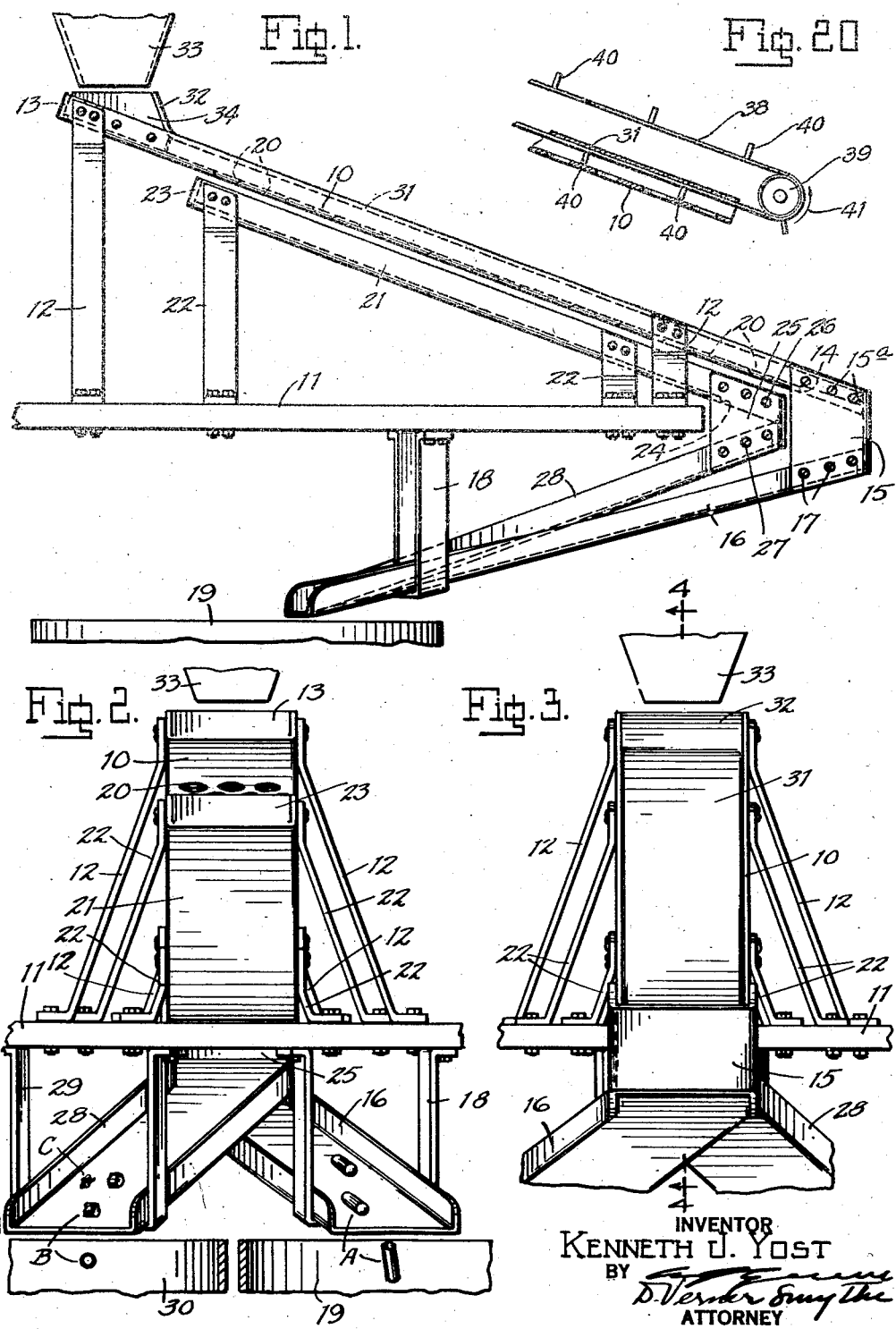

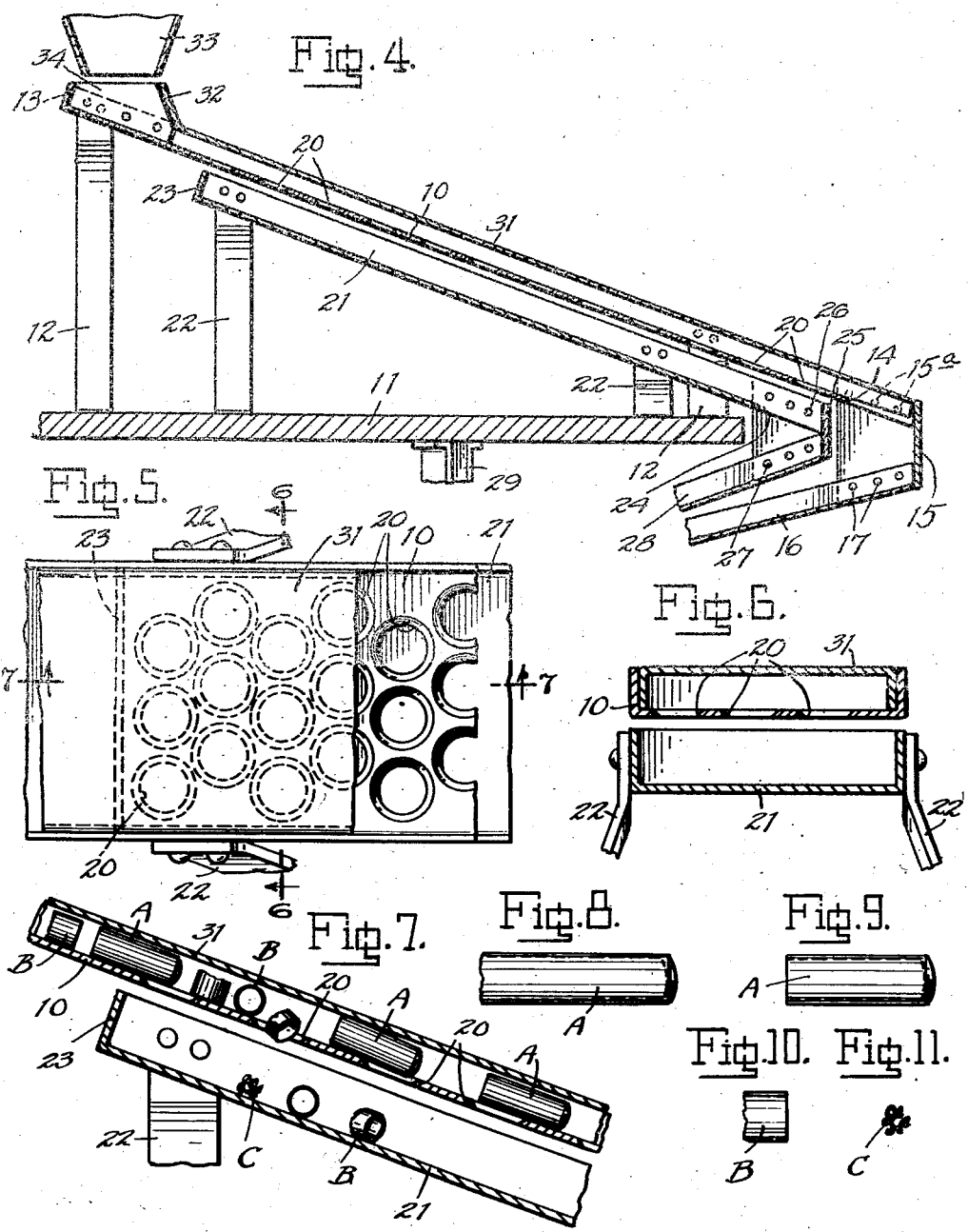

2,356,295

UNITED STATES PATENT OFFICE 2,356,295

ARTICLE CLASSIFYING DEVICE

Kenneth J. Yost, Westport, Conn., assignor to Remington Arms Company, Inc., Bridgeport, Conn., a corporation of Delaware Application May 7, 1942, Serial No. 442,042

4 Claims. (Cl. 209—85)

The present invention relates to an article classifying device, and particularly such a device for separating relatively long articles or work pieces from relatively short articles or scrap, the latter usually being cut-off end portions of the long articles so that they are of the same thickness or diameter as the long articles. The invention also contemplates the separation of shavings, chips or other scrap which may have a thickness or diameter either greater or less than that of the work pieces. The present disclosure is concerned especially with the classifying of cartridge cases and the scrap metal produced during certain operations thereon, so that while the device of the invention is not limited to this particular use, the objects and advantages of the invention will be directed by way of example to the particular problems involved in the classifying of cartridge case bodies and the scrap produced during their manufacture.

In the manufacture of cartridge cases or shells a heavy walled and shallow cup is reformed in a series of drawing operations to approximately the diameter and wall thickness of the finished case. The strain on the metal is so severe that frequent annealings between draws are necessary, and one or more sections of over-strained metal are trimmed off from the mouth of the case. The over-strained portion of metal is at the open end of the case and this is cut off in the form of a cylindrical ring, the cutting operation producing in addition to the ring fine shavings or chips of metal. This ring is the same diameter as the cartridge body and the fine shavings or chips produced during the cutting operation are smaller than the shell diameter. After the final draw, and necking in the case of large caliber shells, the shell mouth is trimmed and chamfered and a turning operation may be performed on the head. These trimming, turning, and chamfering operations result in scrap which may be in the form of shavings and chips, or in the form of rings having a length up to their diameter. In certain operations involving heavy turning cuts masses of relatively heavy shavings may accumulate which not infrequently have a larger diameter than the diameter of the shell.

The separation of such scrap from the shells or work pieces has always been a difficult problem, and obviously a 100% separation of the scrap from the work pieces is most desirable for the reason that even the infrequent presence of a ring or shaving or chip may have a disastrous effect on tools in subsequent operations upon the work pieces. The most common procedure at present, for separating the scrap from the work pieces, consists in providing an air jet in the individual machines operating upon the work pieces, so that the scrap is directed in one path of removal, while the work pieces are removed in another path. This procedure has not been found to effect a 100% separation, and therefore, it has been necessary to belt-inspect the work pieces. Reliance on visual inspection has proved less than 100% effective.

It is an object of the present invention to provide a classifying device into which both the work pieces and the scrap produced during any trimming or machining operation may be placed, and which will effectually separate the scrap from the work pieces.

A further object is to provide such a device which is gravity operated and in which moving parts are dispensed with, so that the separating operation can be carried out without providing power means therefore, and the device may be placed in any convenient location for receiving the articles to be separated, as for instance in direct relation to a machine operating upon the pieces or in relation to a hopper into which the product of several machines may be placed.

A further object is to provide a device consisting of an inclined screen having openings therein through which the scrap pieces may pass, and a cover arranged parallel to the screen at such distance therefrom that the relatively long work pieces will be restricted against tilting into the screen openings and passing therethrough, so that these work pieces will flow over the screen, while the scrap passes through it.

It is further proposed to provide cover means which has a fixed relation to the screen and which is so spaced therefrom that the work pieces may pass between the screen and the cover means with clearance, while at the same time the cover means functions to prevent the work pieces from tilting into and through the screen openings. The particular work pieces disclosed herein are in the form of cartridge shell bodies which are heavier at one end than the other so that the center of gravity and the balance point between the ends is nearer the heavy end than the light end. It is proposed in connection with this type of article to provide a classifying device in which the work pieces will flow downwardly with the heavy ends forward, and further to provide such clearance between the cover and the work pieces so related to the dimensions of the work pieces and the hole diameters of the screen that such over-balancing of the heavy end will not result in the work pieces passing through the screen openings. In this connection it is proposed, in certain embodiments of the invention, to provide the screen holes with bevelled surfaces adapted to permit slight tilting of the work pieces while at the same time guiding them over the screen, this arrangement permitting a maximum diameter hole so that scrap will pass freely therethrough.

It is further proposed to provide a classifying device in which both the work pieces and the scrap will move freely by gravity along the screen surface, the work pieces moving in substantially straight lines and at relatively high velocity, due to their forward weighted ends, while the movement of the scrap will be at less velocity and in divergent directions, due to the size variation in the scrap and the fact that the pieces of scrap may either roll or slide depending upon their position upon the screen, this relative difference in the velocity between the work pieces and the scrap reducing the tendency of the scrap to jump across the screen holes and insuring a complete separation of the scrap within a minimum distance of movement over the screen.

A further object is to provide a classifying device having a removable cover, enabling the same device to be operated without the cover for the purpose of separating scrap of greater diameter than the work pieces, such as large shaving masses, by passing the work and scrap over the uncovered screen, in which case the work pieces and small scrap pass through the screen openings, while the large diameter shavings are discharged from the end of the screen. The separated work pieces and small scrap may thereupon be passed over the screen of the same classifying device with the cover in place, or directed to the covered screen of another device arranged in cascade relation to the uncovered screen.

With the above and other objects in view, embodiments of the invention are shown in the accompanying drawings, and these embodiments will be hereinafter more fully described with reference thereto, and the invention will be finally pointed out in the claims.

In the drawings—

Fig. 1 is a side elevation of an article classifying device, according to the invention.

Fig. 2 is an end vew, looking from the lefthand side of Fig. 1.

Fig. 3 is an end view, looking from the righthand side of Fig. 1.

Fig. 4 is a vertical longitudinal sectional view, taken along the line 4—4 of Fig. 3.

Fig. 5 is an enlarged fragmentary plan view of the screen, its cover, and its scrap receiving apron.

Fig. 6 is a transverse vertical sectional view, taken along the line 6—6 of Fig. 5.

Fig. 7 is a vertical longitudinal sectional view, taken along the line 7—7 of Fig. 5, and illustrating several of the cartridge cases and pieces of scrap in relation thereto.

Fig. 8 is a side elevation of a cartridge case as it appears after a drawing operation thereon.

Fig. 9 is a side elevation of the cartridge case after the ring of scrap metal at the open end is trimmed therefrom.

Fig. 10 is a side elevation of the ring trimmed from the case as shown in Fig. 9.

Fig. 11 is a side elevation of the small mass of shavings such as may be produced by the ring cutting-off tool.

Fig. 12 is a fragmentary longitudinal vertical sectional view of a portion of the covered screen, having bevelled wall screen openings, and showing in dot-and-dash lines the relative tilted position that the cartridge shell may assume in relation to the screen openings while passing over the screen.

Fig. 13 is a similar view of a modified form of screen having cylindrical wall openings, and illustrating a substantially longer cartridge case than that shown in Fig. 12.

Fig. 14 is a similar view of another modified form of screen, especially adapted for relatively short cartridge cases.

Fig. 15 is a fragmentary plan view of the screen and cover according to the modification illustrated in Fig. 14.

Fig. 16 is a vertical longitudinal sectional view showing the device in operation without the cover, for the purpose of separating large masses of scrap, and showing a second covered screen unit in cascade relation therewith to receive the separated shells and small scrap.

Fig. 17 is a side elevation of a type of cartridge case as produced following the final draw and in which typical machining operations have been performed thereon, consisting in removing the ring of scrap metal, beveling the open end and grooving the head end of the shell.

Fig. 18 shows the side elevation of the removed ring.

Fig. 19 shows various types of chips or shavings that may be produced by the several machining operations on the cartridge case as illustrated in Fig. 17, at least one of these being in the form of a shaving mass of greater diameter than the case.

Fig. 20 is a fragmentary sectional elevation showing a modification employing wipers.

Referring to the drawings, the article classifying device, according to the exemplary embodiment of the invention shown therein, comprises an elongated downwardly inclined screen member 10, mounted upon a table or other suitable support 11 by means of standards 12, riveted or otherwise suitably secured to the side walls of the screen member, and bolted or otherwise suitably secured to the table support 11. The screen member is conveniently constructed of a length of channel stock having a relatively wide base and upwardly bent side walls, the base being extended and bent upwardly at the upper end of the screen to provide an end wall 13, while the base at the lower end of the screen is cut away between the side walls, as at 14, to provide a drop opening for the work pieces within the end fixture of the screen member, as will presently more fully appear.

While the lower end of the screen member may be open to allow the work pieces to pass directly over the end into a suitable receptacle, it is preferred to redirect the work pieces by chute means to a receptacle beneath the table support 11, and for this purpose a U-shaped end fixture 15 is secured at its side wall portions to the lower ends of the side walls of the screen member by means of screws 15a, this fixture extending vertically downwardly from the drop opening 14 at the lower end of the screen, and having connected to its lower end the upper end of a downwardly inclined chute member 16 secured thereto by screws 17, this chute member being supported near its lower end in a suitable U-shaped strap hanger 18 secured to the underside of the table support 11. The chute 16 preferably extends at an outward angle from the end fixture 15, so that its discharge end may be directed into a suitable bin or barrel 19 arranged in side by side relation to the bin or barrel for receiving the scrap, as will presently more fully appear.

The screen member is provided with a series of rows of staggered holes 20, these holes starting at some distance from the upper end of the screen member so that an imperforate length of the screen member surface is provided at the upper end along which the work pieces and scrap may move for a short distance before reaching the screen openings, so that as to gain velocity and permit the work pieces to assume their substantially straight line position with their closed weighted ends forward. The velocity assumed by the scrap in passing over this imperforate surface will be substantially less than the velocity of the work pieces, due to their irregular shapes and the fact that certain of them will roll while others will slide, and as this velocity of the scrap pieces is further retarded as they come into relation with the screen openings, there is no chance that their velocity will be such that any of the scrap pieces will jump all of the screen openings along the length of the screen, but on the other hand will positively pass through the openings.

Beneath the screen member there is provided an apron member 21 for receiving the scrap, this member being also conveniently formed from a length of channel stock and supported in inclined relation beneath and parallel to the screen member upon the table support by means of standards 22, substantially similar to standards 12. This apron member is provided at its upper end with a closure wall 23 and at its lower end is cut out between the side walls, as at 24, to provide a drop opening within the end fixture 25, which is secured by screws 26 to the lower ends of the side walls of the apron, this fixture being of similar form to the fixture 15 of the screen member, and having connected to its lower end by means of screws 27 a downwardly inclined chute member 28 supported near its lower end in a U-shaped strap hanger 29 secured at the underside of the table support. This chute member preferably extends at an outward angle from the fixture 25, in opposite direction from the outward angle of the chute member 16, so that its discharge end is conveniently directed into a bin or barrel 30 disposed in side by side relation with the bin or barrel 19.

The cover member 31 for the screen member is in the form of a length of channel stock adapted to have its side walls fit telescopically within the side walls of the screen member and with its transverse top wall in predetermined spaced parallel relation to the base wall of the screen member. This spacing is determined by the diameter or thickness of the particular articles being classified. At its lower end the cover member abuts the end fixture 15, and at its upper end the top wall is provided with an extension 32 inclined upwardly in divergent relation to the imperforate upper end of the screen member, so as to provide a converging entrance mouth for directing the articles to be classified between the screen and cover as these articles are fed upon the upper end of the screen from the hopper 33, or from other suitable feed means. The marginal side portions of the extension 32 rest upon the forward inclined edges of a pair of guard plates 34 rivetted to the inner sides of the side walls of the screen member, these guard plates projecting upwardly from the side walls to provide with the extension 32 a retaining means to prevent the articles from jumping out of the upper end of the screen member as they are dropped thereon. The upper end of the cover member extends for a sufficient distance above the first row of screen openings 20, so that the articles are in cooperative relation between the spaced parallel screen and cover members before reaching the first row of screen openings.

Fig. 8 illustrates a cartridge case A as it appears following a drawing operation thereon, it being understood that in the process of manufacturing cartridge cases the shell is subjected to several drawing and annealing operations from the original cup member to the finished shell. The drawing operation is such that the metal at the open end of the case is severely over-strained and this over-strained metal is cut off in the form of a ring of scrap metal. Fig. 9 shows the case A after the ring is trimmed therefrom. Fig. 10 shows the trimmed scrap ring B, and Fig. 11 shows a curl or mass of shaving C, such as may be produced by the cutting operation. The length of the ring B is usually equal to or somewhat less than its diameter, so that a screen opening calculated with respect to the diameter of the cartridge case will be sufficiently large to allow any of the scrap pieces to pass through it. The disposition, according to the invention, of larger scrap produced by heavy turning cuts will be hereinafter described in detail.

As shown in Figs. 1 to 7 and 12, the walls of the screen openings 20 are bevelled so that they converge downwardly. The diameter of the openings is predetermined so that they will be sufficiently large to allow the pieces of scrap to pass freely therethrough, and the angle of the bevelled walls is predetermined with respect to the length of the cartridge cases, and their approximate balance point or center of gravity, and the clearance space between the cartridge cases and the cover member, so that in the case of the balance point or center of gravity being at a distance from the forward weighted end of the cartridge case less than the diameter of the screen opening the slightly tilted position which the cartridge case will take as its weighted forward end moves across a screen opening will not be sufficient to cause the cartridge case to tilt through the screen opening, and as the cartridge case continues its downward movement along the screen, the forward end will engage the forward bevelled surface of the screen opening and be guided back into parallel relation upon the screen surface. With this arrangement, a relatively large clearance may be provided between the cartridge cases flowing over the screen and the cover member, so that they will have free movement along the screen surface. The scrap rings and chips and shavings will flow with less velocity than the cartridge cases because of their lighter weight, their irregular shapes, and the fact that they do not naturally assume a straight line path, such as is assumed by the cartridge cases. Consequently there is little tendency for the scrap pieces to jump the openings and in any case all of the scrap pieces will pass through the openings before they can reach the lower end of the screen. The screen openings may have any suitable arrangement and spacing to accomplish the purpose of the invention. For instance, instead of the arrangement as illustrated in Fig. 5 the transverse staggered rows may be brought closer together by more widely spacing the openings of each row.

Fig. 12 shows in full lines the parallel position of a cartridge case flowing over the screen and in dot-and-dash lines the slightly tilted position in relation to a screen opening, and from which position the bevelled forward wall of the screen opening will direct the cartridge shell into parallel relation on the screen. There is also shown in this Fig. 12 one of the scrap rings passing through a screen opening.

The device will operate effectually without the necessity for extraneous agitation and may be rigidly mounted. The slight vibratory agitation that is set up in the device inherently through the dropping of the pieces upon the upper end of the screen member from the hopper and the dropping of the pieces from the ends of the screen member and the apron member to the chute members, prevents any possibility of one of the pieces of scrap failing to move along the screen surface. The imperforate upper end portion of the screen is of sufficient length that the cartridge cases will attain such velocity that they will arrange themselves in straight line position parallel to the length of the screen before reaching the first row of screen openings.

Agitation may also be provided by making supports 12 of thin metal so that the vibration of the machine to which the screen may be attached will result in vibration of the screen.

In Fig. 13 I have illustrated a modified form of the invention in which the screen openings $20^a$ have cylindrical walls and there is illustrated in relation thereto a type of cartridge case adapted to pass over this type of screen. This cartridge case $A^1$ is relatively longer than the cartridge case A and the approximate balance point or center of gravity is at a distance from the forward weighted end greater than the diameter of the hole $20^a$ so that the cartridge case will pass freely over the screen openings without any tendency to tilt. At the same time, the diameter of the cartridge case is substantially less than the diameter of the screen opening so that the scrap rings will pass freely therethrough.

In Figs. 14 and 15, I have illustrated another modified form of the invention especially adapted for use with relatively short cartridge cases $A^2$. The screen openings $20^b$ are of cylindrical form and at their forward sides are connected with relatively long gouged out bevelled recesses 35 adapted to guide the slightly tilted cases out of the screen openings and back into parallel relation upon the screen surface. With this arrangement, wherein the rearward wall of the screen opening is cylindrical up to the flat upper surface of the screen, the fulcrum point at the edge of the screen opening about which the overbalanced cartridge case tilts is at a point substantially nearer the lower wall of the opening than is the case with the bevel-walled opening of the same diameter shown in Fig. 12. Therefore, the relatively shorter shell as shown in Fig. 15 and which would normally have a greater degree of tilt than the longer cartridge case shown in Fig. 12 for the same hole diameter and cover clearance will not tilt downwardly in the opening $20^b$ to any greater extent than the longer cartridge case as shown in Fig. 12, and will be effectually guided back to its parallel relation upon the screen by the recess 35.

In certain operations upon the cartridge cases, particularly in finishing the cases after the final draw, such as turning a bevelled edge upon the necked open end of the case and turning a groove in the head end, masses of shavings may accumulate and may be engaged and carried away with the work pieces. Such masses not infrequently have a larger diameter than the diameter of the cartridge cases. For instance in Figs. 17 to 19 there is illustrated a finished cartridge case $A^3$, the cut off end ring of scrap metal B, and several pieces of shaving C, at least one of which is in the form of a mass of larger diameter than the cartridge case.

In order to separate all of this scrap from the finished cartridge cases, the classifying device as hereinbefore described may be operated with the cover member 31 removed, the cartridge cases and all of the scrap being fed from the hopper to the screen member 10. The large masses of scrap of greater diameter than the screen openings 20 will pass along the screen and over the end thereof, while the cartridge cases and the smaller scrap will pass through the screen openings to the apron 21 beneath the screen, the absence of the cover member allowing the cartridge cases to tilt into and through the screen openings. For convenience, the end fixture 15 and the chute 16 may be removed from the lower end of the screen and the large scrap pieces directed into a receptacle 36 placed thereunder. The chute 28 along which the cartridge cases and small scrap flow from the apron 21 may be directed into a second classifying device positioned in cascade arrangement, this second classifying device having the cover member 31 in place and functioning to separate the small scrap from the cartridge cases.

In Fig. 20 is shown a further modification wherein an endless belt 38 passing over suitable pulleys, one of which is seen, at 39, may be used to carry wipers 40. The pulley at the other end of the screen and the drawing means are not shown in the interest of clarity. The wipers are fastened to the belt and extend across the face of the screen member 10. The belt passes under the cover member 31. The wipers are moved in the direction shown by the arrow 41 and will serve to positively push any scrap pieces which might accidentally not go through the holes because of their shape such as very curly shavings. The belt may be of any suitable material such as rubber, leather, metal chain or canvas and may extend partially or all the way across the screen. The belt may also consist of one piece or may be in two pieces, one on each side of the screen with the wipers attached thereto. The wipers may be of any suitable material such as rubber, leather, flexible metal or canvas.

The form of the invention illustrated in the drawings and described herein is typical and illustrative only, and it is evident that the invention is capable of embodiments in other forms, all falling within the scope of the appended claims.

What is claimed is:

1. In a classifying device for classifying articles wherein certain of said articles are of elongated cylindrical form and are of greater weight at one end than the other, whereby their center of gravity is at a point closer to said weighted end than the unweighted end, and wherein others of said articles are of a diameter and length equal to or less than the diameter of said first mentioned articles, an inclined screen having a series of openings therein, said openings being smaller in diameter than the length of said first mentioned articles, whereby said first mentioned articles are adapted to pass over said openings and of greater diameter than the length and diameter of others of said articles to be classified, whereby said other articles pass through said openings, the diameter of said openings being also greater than the distance between the weighted end of said first mentioned articles and their center of gravity point, whereby the weighted end tends to tilt into said openings, and a cover arranged in spaced parallel relation to said screen, the spacing of said cover from said screen being slightly greater than the diameter of said articles, whereby said articles are adapted to pass freely between the screen and cover surfaces and said cover limits the tilting of said first mentioned articles to a point where they cannot pass through said openings, the walls of said openings being each provided with a bevelled surface disposed forwardly and adapted to guide the forward end of a tilted article on to the screen surface.

2. In a classifying device for classifying articles wherein certain of said articles are of elongated cylindrical form and are of greater weight at one end than the other, whereby their center of gravity is at a point closer to said weighted end than the unweighted end, and wherein others of said articles are of a diameter and length equal to or less than the diameter of said first mentioned articles, an inclined screen having a series of openings therein, said openings being smaller in diameter than the length of said first mentioned articles, whereby said first mentioned articles are adapted to pass over said openings and of greater diameter than the length and diameter of others of said articles to be classified, whereby said other articles pass through said openings, the diameter of said openings being also greater than the distance between the weighted end of said first mentioned articles and their center of gravity point, whereby the weighted end tends to tilt into said openings, and a cover arranged in spaced parallel relation to said screen, the spacing of said cover from said screen being slightly greater than the diameter of said articles, whereby said articles are adapted to pass freely between the screen and cover surfaces and said cover limits the tilting of said first mentioned articles to a point where they cannot pass through said openings, the walls of said openings being each cylindrical at its rearward side and having at its forward side a relief surface inclined forwardly from a point near the lower end of said opening to the upper screen surface and adapted to guide the forward end of a tilted article on to the screen surface.

3. In a classifying device for classifying cartridge cases and scrap rings cut therefrom wherein said cartridge cases are of elongated cylindrical form and are of greater weight at one end than the other, whereby their center of gravity is at a point closer to said weighted end than the unweighted end, an inclined screen having a series of openings therein, said openings being smaller in diameter than the length of said cartridge cases, whereby said cartridge cases are adapted to pass over said openings and of greater diameter than the length and diameter of said scrap rings, whereby said scrap rings pass through said openings, the diameter of said openings being also greater than the distance between the weighted end of said cartridge cases and their center of gravity point, whereby the weighted end tends to tilt into said openings, and a cover arranged in spaced parallel relation to said screen, the spacing of said cover from the screen being slightly greater than the diameter of said cartridge cases and scrap rings, whereby they are adapted to pass freely between the screen and cover surfaces and said cover limits the tilting of said cartridge cases to a point where they cannot pass through said openings, the walls of said openings being each provided with a bevelled surface disposed forwardly and adapted to guide the forward end of a tilted cartridge case on to the screen surface.

4. An ammunition cartridge case and scrap ring separator for separating generally cylindrical elongated cartridge cases of greater weight at one end than the other so that their center of gravity is at a point closer to the weighted end than the unweighted end, an inclined smooth plate screen with an initial imperforate portion at the feed end of sufficient extent to allow said cases to gain velocity, said screen having a series of openings therein, said openings being substantially smaller in diameter than the length of said cases and larger in diameter than the transverse dimension of said cases and larger than any dimension of said scrap rings, an imperforate cover substantially parallel to said screen and spaced therefrom slightly more than said transverse cartridge case dimension, said spacing being such and the velocity gained by the cases being sufficient so that said cases are substantially prevented from tilting up and passing through said screen openings as they slide down the screen and said scrap rings pass through said openings.

KENNETH J. YOST.